UNITED STATES PATENT OFFICE.

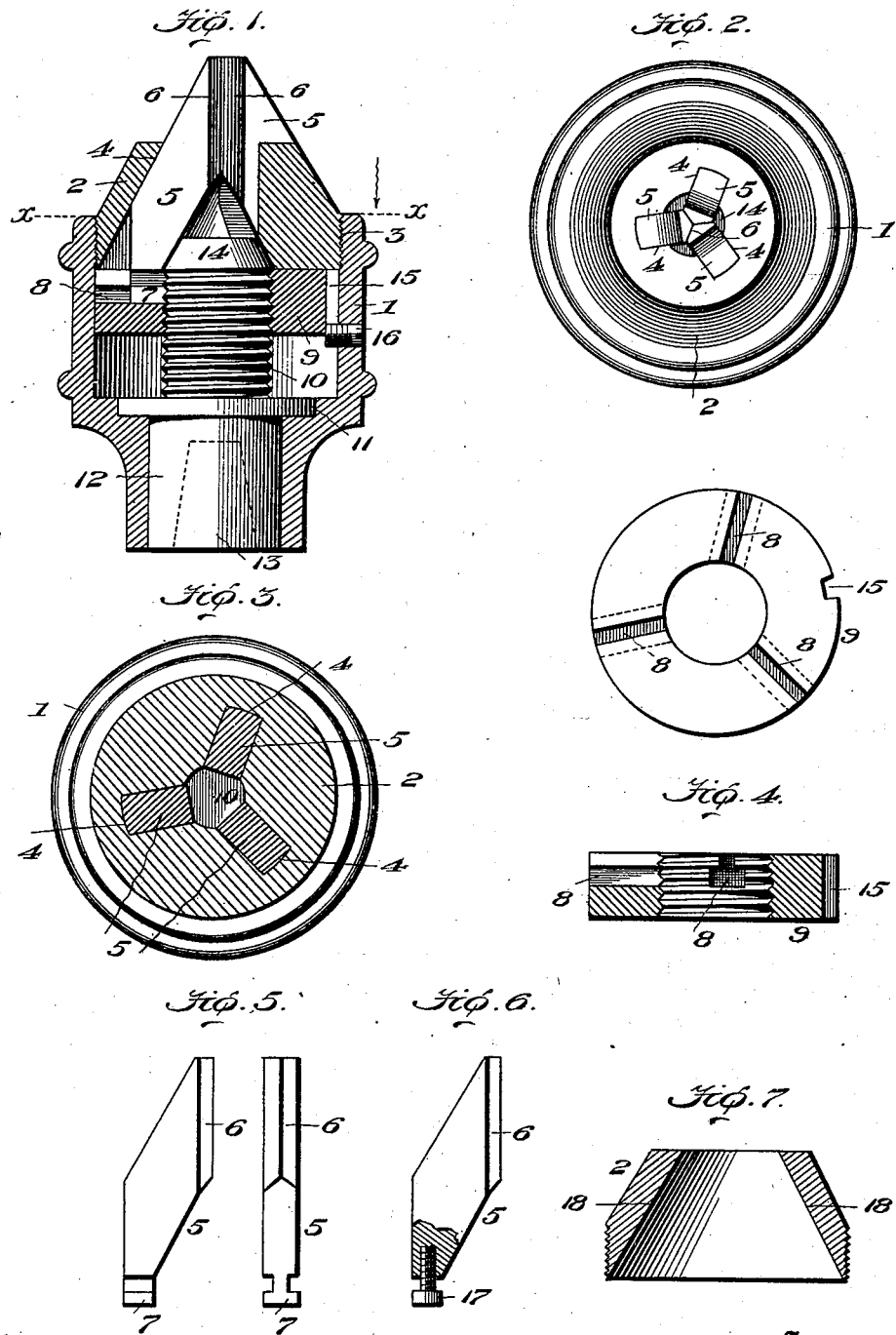

FREDERIC PAYNE GATES, OF NEW LONDON, CONNECTICUT, ASSIGNOR OF ONE-HALF TO C. ROBERT GATES, OF NEW LONDON, CONNECTICUT.

DRILL-CHUCK.

SPECIFICATION forming part of Letters Patent No. 722,575, dated March 10, 1903.

Application filed March 13, 1902. Serial No. 98,095. (No model.)

*To all whom it may concern:*

Be it known that I, FREDERIC PAYNE GATES, a citizen of the United States, residing at New London, county of New London, and State of Connecticut, have invented certain new and useful Improvements in Drill-Chucks, of which the following is a specification.

My invention relates to drill-chucks.

The object of the present invention is the provision of a drill-chuck of simple and improved construction which will be positive and reliable in its action and capable of easy manipulation and one in which the coaction of the parts will be such that the chuck will not be liable to get out of order.

Having the foregoing objects and others not specifically mentioned in view, the invention consists of a drill-chuck comprising certain improved features and novel combinations of parts set forth in detail hereinafter.

In the accompanying drawings, Figure 1 is a longitudinal section; Fig. 2, an end view; Fig. 3, a section on line $x\ x$ of Fig. 1; Fig. 4, details of the nut; Fig. 5, details of one of the jaws; Fig. 6, a detail of a modified construction of jaw, and Fig. 7 a detail of a modified form of jaw-holder.

The numeral 1 designates the shell or casing, which is suitably knurled, so as to afford a convenient hold for the hand to turn the same, while 2 is the jaw-holder, which is screw-threaded into the casing at 3 and provided with converging or tapered channels or ways 4, in which the jaws 5 are adapted to slide, said jaws having tapered or converging faces 6 and being provided with T-heads 7 at their lower ends, which are adapted to slide radially in respective T-slots 8, cut in and disposed radially of a nut 9, slidable within the casing 1.

The numeral 10 designates a feed-screw having a collar 11 adapted to turn in an annular depression in the casing and provided with a portion 12, with a suitably-tapered socket 13, adapted to fit the mandrel on which the chuck is to be used. The end of the screw 10 is tapered at 14, the taper being the same as the taper 6. The nut 9 is engaged by the feed-screw 10, which passes therethrough and by means of which the said nut is advanced or retracted within the shell, this being accomplished by the rotation of the shell. To prevent turning of the nut, it is provided with a groove 15 in its edge, which receives the nib or point of the headless screw 16, threaded in the side of the shell.

I sometimes prefer to employ the jaw construction shown in Fig. 6, where a screw 17 is used in place of the T-head 7, but slides in the T-slot in the nut in the same manner.

In the smaller sizes of the chuck it is sometimes preferable to dispense with the channel 4 and have the interior of the jaw-holder 2 perfectly plain, but tapered, as at 18, as shown in Fig. 7.

In using the chuck the shell is turned by hand, or the mandrel can be turned, which causes the nut to travel along the feed-screw, thereby drawing in the jaws, which are spread apart by the beveled or tapered end of the feed-screw and move laterally at their inner ends in the radial slots in the nut. Reverse movement causes the jaws to be projected and closed together.

I am aware that slight changes of construction might be resorted to in carrying out the invention without detracting from any of its advantages or impairing its general efficiency in mode of operation, and I do not, therefore, limit myself to the precise construction herein shown and described, but consider that I am entitled to all such changes and modifications as fall fairly within the spirit and scope of the invention.

Having thus described my invention, what I claim as new, and desire to secure by Letters Patent, is—

In a drill-chuck, the combination with a casing and a jaw-holder having a smooth conical interior, of a screw in the casing, a nut engaged with the screw and slidable in the casing and having a flat face provided with radial undercut grooves or channels, jaws in the jaw-holder which are provided with headed members received by and slidable in the radial grooves, and means for preventing relative turning of the nut and casing comprising a slot and pin.

In testimony whereof I hereunto affix my signature in presence of two witnesses.

FREDERIC PAYNE GATES.

Witnesses:
BENJAMIN F. GATES,
GEO. F. ROWLAD.